United States Patent Office 3,845,150
Patented Oct. 29, 1974

3,845,150
AROMATIZATION OF HYDROCARBONS
Tsoung-Yuan Yan, Trenton, and John C. Zahner, Princeton, N.J., assignors to Mobil Oil Corporation
No Drawing. Filed Aug. 24, 1973, Ser. No. 391,445
Int. Cl. C07c 3/02
U.S. Cl. 260—673.5            5 Claims

ABSTRACT OF THE DISCLOSURE

The conversion of various hydrocarbons to aromatics by contact with a ZSM-5 type of catalyst at appropriate aromatization conditions of temperature, pressure and throughput, with such carefully defined feed parameters as to significantly improve the operation of such aromatization process from an economics point of view by substantially eliminating heat input requirements ordinarily associated with aromatization of saturated hydrocarbons by combining the exothermic aromatization of light olefins with the endothermic aromatization of saturated hydrocarbons.

---

This invention relates to the aromatization of various hydrocarbons. It more particularly refers to such aromatization carried out under a narrowly prescribed set of operating parameters so as to minimize heat exchange requirements and therefore maximize economic attractiveness.

In recent years there has been developed a novel series of zeolite catalysts which are differentiated from other zeolites in that they appear to have elliptical pores rather than the substantially round pores of other zeolites. This pore shape seems to be indicated by the fact that this new family or zeolites will sorb and act upon slightly branded paraffins, e.g. monomethyl substituted, whereas other, older zeolites either reject such monomethyl substituted paraffins and admit only normal paraffins or are nonselective as to which compounds will be admitted. This new family of zeolites has been named ZSM-5 type.

The catalyst used for this known process has been stated to be a ZSM-5 type of catalyst which includes ZSM-5, ZSM-11, ZSM-21 and other similarly behaving zeolites.

ZSM-5 is disclosed and claimed in U.S. Pat. No. 3,702,886, ZSM-21 is disclosed and claimed in application Ser. No. 358,192, filed May 7, 1973 and ZSM-11 is disclosed and claimed in U.S. Pat. 3,709,979.

The family of ZSM-5 compositions has the characteristic X-ray diffraction pattern set forth in the table hereinbelow. ZSM-5 compositions can also be identified, in terms of mole ratios of oxides, as follows:

$$0.9 \pm 0.2 M_{2/n}O : W_2O_3 : bYO_2 : zH_2O$$

wherein M is a cation, $n$ is the valence of said cation, W is selected from the group consisting of aluminum and gallium, Y is selected from the group consisting of silicon and germanium, $z$ is from 0 to 40 and $b$ is at least 5 and preferably 15–300. In preferred synthesized form, the zeolite has a formula, in terms of mole ratios of oxides, as follows:

$$0.9 \pm 0.2 M_{2/n}O : Al_2O_3 : 15\text{--}300 SiO_2 : zH_2O$$

and M is selected from the group consisting of a mixture of alkali metal cations, especially sodium and alkyl ammonium ions, especially tetraalkylammonium cations, the alkyl groups of which preferably contain 2–5 carbon atoms.

In a preferred embodiment of ZSM-5, W is aluminum, Y is silicon and the silica/alumina mole ratio is at least 15, preferably at least 30.

Members of the family of ZSM-5 zeolites which include ZSM-5, ZSM-11 and ZSM-21 possess a definite distinguishing crystalline structure whose X-ray diffraction pattern shows the following significant lines:

TABLE

| Interplanar spacing $d$(A): | Relative intensity |
|---|---|
| 11.1±0.3 | S |
| 10.0±0.25 | S |
| 7.4±0.2 | W |
| 7.1±0.15 | W |
| 6.3±0.1 | W |
| 6.04±0.1 | W |
| 5.97±0.1 | W |
| 5.56±0.1 | W |
| 5.01±0.1 | W |
| 4.60±0.08 | W |
| 4.25±0.08 | W |
| 3.85±0.07 | VS |
| 3.71±0.05 | S |
| 3.64±0.05 | M |
| 3.04±0.04 | W |
| 2.99±0.03 | W |
| 2.94±0.02 | W |

These values, as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these the relative intensities, $100 I/I_o$, where $I_o$ is the intensity of the strongest line or peak, and $d$(obs.), the interplanar spacing in A, corresponding to the recorded lines, were calculated. In the table the relative intensities are given in terms of the symbols S-strong, M-medium, MS-medium strong, MW=medium weak and VS=very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur, depending on the silicon to aluminum ratio of the particular sample, as well as if it has been subjected to thermal treatment.

Zeolite ZSM-5 can be suitably prepared by preparing a solution containing water, tetrapropyl ammonium hydroxide and the elements of sodium oxide, an oxide of aluminum or gallium and an oxide of silica, and having a composition, in terms of mole ratios of oxides, falling within the following ranges:

TABLE

| | Broad | Preferred | Particularly preferred |
|---|---|---|---|
| OH⁻/SiO₂ | 0.07–1.0 | 0.1–0.8 | 0.2–0.75 |
| R₁N+(R₁N⁺+Na⁺) | 0.2–0.95 | 0.3–0.9 | 0.4–0.9 |
| H₂O/OH⁻ | 10–300 | 10–300 | 10–300 |
| YO₂/W₂O₃ | 5–100 | 10–60 | 10–40 | wherein R is propyl, W is aluminum and Y is silicon. This mixture is maintained at reaction conditions until the crystals of the zeolite are formed. Thereafter the crystals are separated from the liquid and recovered. Typical reaction conditions consist of a temperature of from about 75° C. to 175° C. for a period of about six hours to 60 days. A more preferred temperature range is from about 90 to 150° C., with the amount of time at a temperature in such range being from about 12 hours to 20 days.

The digestion of the gel particles is carried out until crystals form. The solid product is separated from the reaction medium, as by cooling the whole to room temperature, filtering and water washing.

ZSM-5 is preferably formed as an aluminosilicate. The composition can be prepared utilizing materials which supply the elements of the appropriate oxide. Such compositions include, for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed.

ZSM-11 can also be identified, in terms of mole ratios of oxides, as follows:

$$0.9 \pm 0.3 M_{2n}O: Al_2O_3: 20-90 \ SiO_2: z \ H_2O$$

wherein M is at least one cation, $n$ is the valence thereof and $z$ is from 6 to 12. In a preferred synthesized form, the zeolite has a formula, in terms of mole ratios of oxides, as follows:

$$0.9 \pm 0.3 \ M_{2/n}O: Al_2O_3: 20-90 \ SiO_2: z \ H_2O$$

and M is selected from the group consisting of a mixture of alkali metal cations, especially sodium, and tetrabutylammonium cations.

ZSM-11 can be suitably prepared by preparing a solution containing $(R_4X)_2O$, sodium oxide, an oxide of aluminum or gallium, an oxide of silicon or germanium and water and having a composition, in terms of mole ratios of oxides, falling within the following ranges:

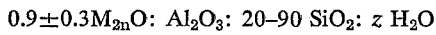

|              | Broad      | Preferred   |
|--------------|------------|-------------|
| $YO_2/WO_2$  | 10–150     | 20–90       |
| $Na_2O/YO_2$ | .05–0.7    | 0.05–0.40   |
| $(R_4X)_2O/YO_2$ | 0.02–0.20 | 0.02–0.15 |
| $H_2O/Na_2O$ | 50–800     | 100–600     | wherein $R_4X$ is a cation of a quaternary compound of an element of Group 5A of the Periodic Table, W is aluminum or gallium and Y is silicon or germanium maintaining the mixture until crystals of the zeolite are formed. Preferably, crystallization is performed under pressure in an autoclave or static bomb reactor. The temperature ranges from 100° C.–200° C. generally, but at lower temperatures, e.g. about 100° C. crystallization time is longer. Thereafter the crystals are separated from the liquid and recovered. The new zeolite is preferably formed in an aluminosilicate form.

ZSM-21 can also be identified, in terms of mole ratios of oxides, as follows:

$$(0.4-2.5)R_2O:0-0.7M_2O:Al_2O_3:10-50SiO_2$$

where R is an organic nitrogen containing cation, for example 2-hydroxyethyl ammonium chloride or pyrrolidine and M is an alkali metal.

ZSM-21 can be prepared by preparing a solution containing sources of an alkali metal oxide, preferably sodium oxide, an organic nitrogen-containing oxide, an oxide of aluminum, an oxide of silicon and water. The solution composition, in terms of mole ratios of oxides, falls within the following ranges:

| R+ | Broad | Preferred |
|---|---|---|
| R+ + M+ | 0.2–1.0 | 0.3–0.6 |
| $OH/SiO_2$ | 0.05–0.5 | 0.07–0.4 |
| $H_2O/OH$ | 50–500 | 100–250 |
| $SiO_2/Al_2O_3$ | 12–200 | 12–60 | where R and M are as previously defined. Typical reaction conditions include heating this reaction mixture to about 90 to 400° C. for about 6 hours to 100 days until crystals form whereupon they are separated from the liquid and recovered. The crystalline product is suitably dried by heating.

An embodiment of this catalyst resides in the use of a porous matrix together with the ZSM-5 type family of zeolite previously described. The zeolite can be combined, dispersed, or otherwise intimately admixed with the porous matrix in such proportions that resulting products contain from 1 to 95% by weight and preferably from 10 to 70% by weight of the zeolite in the final composite.

The term "points matrix" includes non-zeolite inorganic compositions with which the zeolites can be combined, dispersed or otherwise intimately admixed wherein the matrix may be catalytically active or inactive. It is to be understood that the porosity of the composition employed as a matrix can be either inherent in the particular material or it can be introduced by mechanical or chemical means. Representative of matrices which can be employed include metals and alloys thereof, sintered metals, and sintered glass, asbestos, silicon carbide, aggregates, pumice, firebrick, diatomaceous earth, alumina and inorganic oxides. In organic compositions, especially those comprising alumina and those of a siliceous nature are preferred. Of these matrices inorganic oxides such as clay, chemically treated clays, silica, silica alumina, etc. as well as alumina, are particularly preferred because of their superior porosity, attrition resistance and stability.

Techniques for incorporating the ZSM-5 type family of zeolites into a matrix are conventional in the art and are set forth in U.S. 3,140,253.

It is to be noted that when a ZSM-5 type zeolite is used in combination with a porous matrix, space velocities which may be set forth as parameters for this process are based on the ZSM-5 type zeolite alone and the porous matrix is ignored. Thus, whether a ZSM-5 type zeolite is used alone or in a porous matrix, the space velocities in all cases refer to the ZSM-5 type component.

It is known that zeolites, particularly synthetic zeolites can have their composition modified by impregnating certain metals thereonto and/or thereinto. The composition can also be modified by exchanging various anions and/or cations into the crystal structure of the zeolite, replacing more or less of the ions originally present upon production of the zeolite.

The ZSM-5 type family of zeolites have been found to be especially active for aromatization if they have at least a portion of the original cations associated therewith replaced by any of a wide variety of other cations according to techniques well known in the art. Typical replacing cations would include hydrogen, ammonium, and metal cations, including mixtures of the same. Of the replacing cations, preference is given to cations of hydrogen, ammonium, rare earth, magnesium, zinc, calcium, nickel and mixtures thereof. Particularly effective members of the ZSM-5 type family of zeolites are those which have been base exchanged with hydrogen ions, ammonium ions, zinc ions or mixtures thereof. Most especially zinc ZSM-5 is the best presently known catalyst for aromatizations as set forth.

Typical ion exchange techniques would be to contact a ZSM-5 type of zeolite with a salt of the desired replacing cation or cations. Although a wide variety of salts can be employed, particular preference is given to chlorides, nitrates and sulfates.

Representative ion exchange techniques are disclosed in a wide variety of patents, including U.S. 3,140,249; 3,140,251; and 3,140,253.

It is also within the scope of the aromatization process to which this application is directed to incorporate a desired metallic component onto the ZSM-5 type family of zeolites by techniques other than ion exchange. Thus, for example, it is possible to impregnate a desired metallic

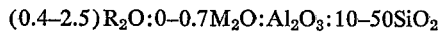

component, such as zinc, platinum or palladium, thereinto by conventional impregnation techniques, as well as merely depositing the elemental metal onto the particular zeolite and in some cases, such as with zinc oxide, to incorporate the metal by physical admixture of the zeolite with an insoluble metal compound.

In any event, following contact with a salt solution of the desired replacing cation, the zeolites are preferably washed with water and dried at a temperature ranging from 150° to about 600° F. and thereafter heated in air or inert gas at temperatures ranging from about 500° F. to 1500° F. for periods of time ranging from 1 to 48 hours or more. It is noted that this heat treatment can be carried out in situ, i.e. while the particular aromatization reaction is taking place, but it is preferred to carry it out as a separate step prior to carrying out the aromatization reaction.

It has also recently been discovered that this ZSM-5 type of zeolite has unusual activity for catalyzing the cyclization of aliphatic compounds into aromatic rings and, under appropriate reaction conditions, alkylating these or other rings while being substantially inert with respect to aromatic rings themselves. U.S. applications Ser. Nos. 153,885 and 253,942 filed respectively on June 16, 1971, now U.S. Pat. No. 3,756,942, and May 17, 1972 amply describe and claim these unusual aromatization capabilities of ZSM-5 type aluminosilicate zeolites.

According to these prior applications, the substance of which are incorporated hereby by reference, suitable hydrocarbon feed materials in the $C_2$ to 400° F. range are contatced with the ZSM-5 type of catalyst at about 650 to 1500° F., depending upon the feed composition, at space velocities of about 0.1 to 15 WHSV, under such combination of conditions as to convert the feed to a mixed product comprising vapor and mainly aromatic liquid in a proportion of at least about 30 grams of liquid product per 100 grams of feed. According to these prior applications, the feed material may comprise paraffins, olefins and/or naphthenes and may be derived from various refinery streams e.g. coker gasoline, naphthas, reformate, pyrolysis gasoline, etc. As a general proposition, aromatization as proposed by these prior applications was considered to be principally a process for upgrading the octane value of various refinery streams boiling in the gasoline range by converting some of the low octane components thereof into high octane aromatics. Aromatization reactions of saturated feeds, like other hydrogen abstracting processes, are highly endothermic and would therefore require significant heat input in some form or other.

One proposal for satisfying the endothemicity of aromatization using a ZSM-5 type of aluminosilicate zeolite catalyst has been to recycle a portion of the aromatics from the product. Since aromatics in general, particularly benzene and lower alkyl substituted benzenes, are substantially inert with respect to ZSM-5 type of aluminosilicate, they would make excellent direct heat exchange agents. However, even this proposal, although viable, is less economically attractive than would be desirable.

It is therefore an object of this invention to provide a novel aromatization process.

It is another object of this invention to provide a novel approach to solving the problem of heat requirements in aromatization processes with ZSM-5 type catalysts.

Other and additional objects of this invention will become apparent from a consideration of this entire specification including the claims hereof.

In accord with and fulfilling these objects, one aspect of this invention comprises aromatizing a particular hydrocarbon feedstock by contacting such with a ZSM-5 type of aluminosilicate zeolite under appropirate temperature, pressure and space velocity conditions, including the absence of added hydrogen, to cause conversion of hydrocarbons in the feed to new aromatic rings. It has been found that if the feed is carefully chosen, the endothermicity formerly attributed to this aromatization reaction is overcome and the reaction can be accomplished in a heat balanced manner (after startup).

According to this invention, the aromatization reaction is carried out in the vapor phase in a reaction zone containing a fluidized or fixed catalyst bed. With an upflow reactor and a fluidized bed, catalyst particles containing ZSM-5 of about 50 to 400 mesh are used; with a fixed bed, catalyst particles containing ZSM-5 of $\frac{1}{16}''$ to $\frac{1}{8}''$ are used. The reaction temperature will be about 650 to 1500° F. and the reaction pressure will be about 0 to 600 p.s.i.g. The reaction mixture suitably passes through the reaction zone at a space velocity of about 0.1 to 15 WHSV.

The feed to the heat balanced process of this invention is suitably a mixure of a predominantly saturated stream and a predominantly olefinically unsaturated stream. Suitable examples of unsaturated streams are light ends from cracking or coking units (for example the stream that might otherwise be used as feed to a refinery alkylation unit), coker gasoline, cracked gasoline and pyrolysis gasoline (for example, the liquid product evolved from naphtha cracking to produce olefins). Other examples of this portion of the feed are olefins themselves in pure or impure form e.g. ethylene, propylene, butylenes, hexylenes, cracked gasoline, etc. The saturated portion of this feed mixture can be supplied by such refinery streams as light reformate, full range reformate, light naphtha, Fischer-Tropsch gasoline, full range naphtha etc.

Taking the mixed feed stream as a whole, it should have an analysis of about

| | Percent |
|---|---|
| Saturates | 20–65 |
| Olefins | 20–50 |

It will also contain some proportion of aromatics. The aromatics are substantially inert with respect to the ZSM-5 under the aforementioned aromatization conditions. It is possible that some small amount of aromatics alkylation may be accompilshed during this process.

The aromatization process of this invention is more efficient and economical than previously described because of the fact that heat input is substantially zero after start up and yet it converts economically disadvantageous, low octane saturates to economically attractive high octane aromatics in significant yields of at least about 50 grams of new aromatics per gram of saturated feed, while also upgrading olefinic feeds to aromatics. It is known that during aromatization reactions of the type described, the ZSM-5 type of catalyst becomes coated with coke which tends to progressively diminish the activity thereof toward the aromatization catalysts. After some period of time, the deposited coke reduces the activity of the catalyst to such an extent that it is necessary to regenerate it. This can be accomplished in the usual manner by burning off the coke with air or by gasifying it with hydrogen. This regeneration can be accomplished in the same vessel in which the aromatization is carried out, by stopping the feed of hydrocarbon reactant, or in a separate the reactor into the regenerator as in fluid catalytic cracking.

This invention will be illustrated by the following examples which are not considered to be limiting on the scope hereof. Parts and percentages are by weight unless expressly stated to be to the contrary.

EXAMPLE I (Prior Art)

A substantially saturated hydrocarbon stream, having a bromine number of about 3, and a boiling range of about 100 to 380° F. was heated to 1000° F. and contacted with a fixed bed of ZSM-5 aluminosilicate catalyst in a matrix having pellet size of about 1 to 2 mm. Throughput was at such a rate as to produce a space velocity of about 1.0. The product evolved from the reaction was about 70 wt. percent liquid having an aromatics content of 90%. It was necessary to externally heat the reaction system at a heat input rate of about 23 Kcal. per mole of feed in order to sustain the reaction at the above referred to level.

EXAMPLE II

Example I above was rerun with a feed which consisted of about 45% of the referred to saturated hydrocarbon material and the remainder a hydrocarbon stream which was about 72% olefinic, having a bromine number of about 260. In this example equivalent conversions to liquid product of equivalent octane value and aromatics content were obtained with only sufficient heat input to the system to bring the charge to reaction temperature.

What is claimed is:

1. In the process of aromatizing hydrocarbons by contacting a feed comprising such with a ZSM–5 type of catalyst at about 650 to 1500° F. and a space velocity of about 0.1 to 15 WHSV in the absence of added hydrogen; the improvement, whereby carrying out such process in a substantially heat balanced condition, which comprises utilizing as said hydrocarbon feed a mixture of saturated and unsaturated fractions so proportioned that the feed contains about 20 to 65% reactive saturates and about 20 to 50% by weight olefins.

2. The improvement as claimed in claim 1 wherein said saturated fraction is selected from the group comprising reformate, virgin gasoline, light naphtha, full range naphtha, Fischer-Tropsch gasoline, crude atmospheric fractionator tower gas overhead, $C_2$ to $C_4$ saturated gas or mixtures thereof.

3. The improvement as claimed in claim 1 wherein said unsaturated fraction is selected from the group comprising an olefin gas stream, coker gasoline, cracked gasoline, pyrolysis gasoline, butene, propylene, ethylene or mixtures thereof.

4. The improvement as claimed in claim 1 including heat exchanging feed and product to an extent sufficient to quench $C_5^+$ high octane gasoline from the product while vaporizing the feed.

5. The improvement as claimed in claim 1 carried out substantially continuously in a fluidized catalyst bed.

References Cited
UNITED STATES PATENTS

| | | | |
|---|---|---|---|
| 3,760,024 | 9/1973 | Cattanach | 260—673 |
| 3,775,501 | 11/1973 | Kaeding et al. | 260—673 |
| 3,583,903 | 6/1971 | Miale et al. | 208—120 |
| 3,140,253 | 7/1964 | Plank et al. | 208—120 |
| 3,140,322 | 7/1964 | Frilette et al. | 260—667 |
| 3,374,281 | 3/1968 | Cricsery et al. | 260—673 |
| 3,296,324 | 1/1967 | Cricsery et al. | 260—673 |
| 3,702,886 | 11/1972 | Argauer et al. | 423—328 |
| 3,729,409 | 4/1973 | Chen | 208—135 |

J. M. NELSON, Assistant Examiner

DELBERT E. GANTZ, Primary Examiner

U.S. Cl. X.R.

208—135; 260—673.5

UNITED STATES PATENT OFFICE
CERTIFICATE OF CORRECTION

Patent No. 3,845,150    Dated October 29, 1974

Inventor(s) TSOUNG-YUAN YAN and JOHN C. ZAHNER

It is certified that error appears in the above-identified patent and that said Letters Patent are hereby corrected as shown below:

| | |
|---|---|
| Column 1, line 35 | "family or" should be --family of-- |
| Column 1, line 59 | "in preferred" should be --in a preferred-- |
| Column 3, line 71 | Under _Preferred_ in the table "0.3-0.6" should be --0.3-0.9-- |
| Column 4, line 14 | "points matrix" should be --porous matrix-- |
| Column 6, lines 59 and 60 | After "or in a separate" add --regenerator by means of transporting the catalyst out of -- |
| Column 7, line 20, Claim 1 | "ata bout" should be --at about-- |
| Column 7, line 31 Claim 2 | "Fisher-Tropsch" should be --Fisher-Tropsche-- |

Signed and sealed this 21st day of January 1975.

(SEAL)
Attest:

McCOY M. GIBSON JR.
Attesting Officer

C. MARSHALL DANN
Commissioner of Patents